(12) United States Patent
Srinivasan et al.

(10) Patent No.: US 9,165,210 B1
(45) Date of Patent: Oct. 20, 2015

(54) SYSTEMS AND METHODS FOR LOCALIZED CONTRAST ENHANCEMENT

(71) Applicant: QUALCOMM Incorporated, San Diego, CA (US)

(72) Inventors: Sujith Srinivasan, San Diego, CA (US); Mainak Biswas, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 16 days.

(21) Appl. No.: 14/288,267

(22) Filed: May 27, 2014

(51) Int. Cl.
*G06K 9/46* (2006.01)
*G06T 5/40* (2006.01)

(52) U.S. Cl.
CPC ............ *G06K 9/4642* (2013.01); *G06K 9/4661* (2013.01); *G06T 5/40* (2013.01)

(58) Field of Classification Search
CPC combination set(s) only.
See application file for complete search history.

(56) References Cited

U.S. PATENT DOCUMENTS

| | | |
|---|---|---|
| 8,009,907 B1 | 8/2011 | Srinivasan et al. |
| 8,213,715 B1 | 7/2012 | Boitano |
| 8,265,391 B1 | 9/2012 | Srinivasan et al. |
| 8,295,596 B1 | 10/2012 | Srinivasan et al. |
| 8,417,046 B1 | 4/2013 | McDougal et al. |
| 2006/0088275 A1 | 4/2006 | O'Dea et al. |
| 2012/0219218 A1 | 8/2012 | Demandolx |
| 2012/0328186 A1 | 12/2012 | Roux et al. |

OTHER PUBLICATIONS

International Search Report and Written Opinion—PCT/US2015/030341—ISA/EPO—Aug. 17, 2015.
Peng R., et al., "Stochastic resonance: An approach for enhanced medical image processing", Life Science Systems and Applications Workshop, LISA 2007, IEEE/NIH, IEEE, PI, Nov. 1, 2007, XP031189229, pp. 253-256, DOI: 10.1109/LSSA.2007.4400932, ISBN: 978-1-4244-1812-1.
Srinivasan S., et al., "44.2: Distinguished Paper: Adaptive Contrast Enhancement for Digital Video," SID International Symposium, SID'07 Digest, May 20, 2007, XP007013286, pp. 1446-1449.

*Primary Examiner* — Duy M Dang
(74) *Attorney, Agent, or Firm* — Knobbe Martens Olson & Bear LLP

(57) ABSTRACT

Systems and methods for improving the contrast of image frames are disclosed. In one embodiment, a system for improving the contrast of image frames includes a control module configured to create an intensity histogram for an image frame, define a set of markers on an intensity range of the histogram, assign a blend factor to each marker, calculate a blend factor for each original pixel of the image, obtain a first equalized pixel output value, calculate a final equalized pixel output value using the blend factor, the first equalized pixel output value, and an original pixel value, and output new pixel values that constitute the output image.

27 Claims, 11 Drawing Sheets

SYSTEMS AND METHODS FOR LOCALIZED CONTRAST ENHANCEMENT

BACKGROUND

1. Field of the Invention

The systems and methods disclosed herein relate generally to contrast enhancement of images and video.

2. Description of the Related Art

Contrast enhancement is used to make images and video look "better" or more pleasing to the viewer, typically by enhancing details that are found in darker portions of an image. Methods for contrast enhancement range from very simple and non-content adaptive solutions (e.g., luma stretch, gamma curves) to very complex solutions (true localized methods, e.g., large scale unsharp masking or window-based histogram equalization). However, when the intensity values of an image already span the entire intensity range, some of these schemes may not be effective. Some of these schemes may also cause brightness shifts in large regions of the picture which is not desirable.

SUMMARY

The systems, methods and devices of the disclosure each have several innovative aspects, no single one of which is solely responsible for the desirable attributes disclosed herein. Combinations of the innovations, aspects and features described herein can be incorporated in various embodiments of systems, methods, and devices, and such combinations are not limited by the examples of embodiments described herein.

Embodiments and innovations described herein relate to systems and methods that may be run in a processor for an electronic device to incorporate localized enhancement of images or videos. Preferably, localized contrast enhancement methods have a wide range of controls and can be implemented in existing hardware or software. However, in some embodiments specially designed hardware and software may improve speed or efficiencies of such processes. In some embodiments, a similar algorithm may be used to improve the visibility of a mobile device display when viewed in sunlight by dynamically switching between contrast enhancement and sunlight visibility modes based on the ambient light level.

In some embodiments, contrast limited histogram equalization is performed to modify the histogram of the input image prior to applying the histogram equalization algorithm.

One aspect relates to a system for improving the contrast of image frames. The system includes a control module configured to determine a histogram representation of an image having a plurality of pixels, each pixel having an intensity value within a range of intensity values, the histogram including the number of pixels of the image that have an intensity value for each intensity value in the range of intensity values, define a set of markers spaced across at least a portion of the range of intensity values of the histogram of the image, each marker having an associated blend factor, determine a pixel blend factor for each pixel of the image based on at least one marker blend factor, determine a first equalized pixel output value for each pixel, and calculate a final equalized pixel output value for each pixel of the image, the final equalized pixel output value for each pixel based on the pixel blend factor of that pixel, the first equalized pixel output value of that pixel, and an original pixel value of that pixel. The system may further include an imaging device comprising an imaging sensor. In some embodiments, the control module is a component of a camera application for a mobile device. In some embodiments, the markers are equally spaced across the range of intensity values. In some embodiments, for a particular pixel, the pixel blend factor is based on interpolating the blend factors of two adjacent markers. In some embodiments, the control module is further configured to perform contrast limited histogram equalization for each pixel of the image to obtain a first equalized pixel output value for each pixel. In some embodiments, the control module is further configured to add a random noise value to the final equalized pixel output value for each pixel. In some embodiments, the control module is further configured to output a modified image based on the final equalized pixel output values. In some embodiments, blend factors defined in low intensity value regions of range of intensity values have a higher weight than the blend factors defined in high intensity value regions of the histogram. In some embodiments, the blend factor for each marker is at least partially based on an ambient light level.

In another aspect, a method for improving the contrast of image frames includes the steps of determining a histogram representation of an image having a plurality of pixels, each pixel having an intensity value within a range of intensity values, the histogram including the number of pixels of the image that have an intensity value for each intensity value in the range of intensity values, defining a set of markers spaced across at least a portion of the range of intensity values of the histogram of the image, each marker having an associated blend factor, determining an pixel blend factor for each pixel of the image based on at least one marker blend factor, determining a first equalized pixel output value for each pixel, and calculating a final equalized pixel output value for each pixel of the image, the final equalized pixel output value for each pixel based on the pixel blend factor of that pixel, the first equalized pixel output value of that pixel, and an original pixel value of that pixel. In some embodiments, the markers are equally spaced along the range of intensity values. In some embodiments, for a particular pixel, the pixel blend factor is based on interpolating the blend factors of two adjacent markers. In some embodiments, the method further includes the step of performing contrast limited histogram equalization for each pixel of the image to obtain a first equalized pixel output value for each pixel. In some embodiments, the method further includes the step of adding a random noise factor to add a random noise value to the final equalized pixel output value for each pixel. In some embodiments, the method further includes the step of outputting a modified image based on the final equalized pixel output values. In some embodiments, defining a set of markers spaced across at least a portion of the range of intensity values of the histogram representation of the image is at least partially determined by an ambient light level. In some embodiments, determining a blend factor for each marker is at least partially determined by an ambient light level.

In yet another aspect, an apparatus for improving the contrast of image frames includes means for determining a histogram representation of an image having a plurality of pixels, each pixel having an intensity value within a range of intensity values, the histogram including the number of pixels of the image that have an intensity value for each intensity value in the range of intensity values, means for defining a set of markers spaced across at least a portion of the range of intensity values of the histogram of the image, each marker having an associated blend factor, means for determining a pixel blend factor for each pixel of the image based on at least one marker blend factor, means for determining a first equalized pixel output value for each pixel, and means for calculating a final equalized pixel output value for each pixel of the image, the final equalized pixel output value for each pixel based on the pixel blend factor of that pixel, the first equalized pixel output value of that pixel, and an original pixel value of that pixel.

In another aspect, a non-transitory computer-readable medium stores instructions that, when executed, cause at least one physical computer processor to perform a method for improving the contrast of image frames. The method includes the steps of determining a histogram representation of an image having a plurality of pixels, each pixel having an intensity value within a range of intensity values, the histogram including the number of pixels of the image that have an intensity value for each intensity value in the range of intensity values, defining a set of markers spaced across at least a portion of the range of intensity values of the histogram representation of the image, each marker having an associated blend factor, determining a pixel blend factor for each pixel of the image based on at least one marker blend factor, determining a first equalized pixel output value for each pixel, and calculating a final equalized pixel output value for each pixel of the image, the final equalized pixel output value for each pixel based on the pixel blend factor of that pixel, the first equalized pixel output value of that pixel, and an original pixel value of that pixel. In some embodiments, the markers are equally spaced across the range of intensity values. In some embodiments, for a particular pixel, the pixel blend factor is based on interpolating the blend factors of two adjacent markers. In some embodiments, the method includes the step of performing contrast limited histogram equalization for each pixel of the image to obtain a first equalized pixel output value for each pixel. In some embodiments, the method includes the step of adding a random noise value to the final equalized pixel output value for each pixel. In some embodiments, the method includes the step of outputting a modified image based on the final equalized pixel output values. In some embodiments, defining a set of markers spaced across at least a portion of the range of intensity values of the histogram representation of the image is at least partially determined by an ambient light level. In some embodiments, determining a blend factor for each marker is at least partially determined by an ambient light level.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

As used herein, an "image histogram" generally refers to a type of histogram that is a graphical illustration representing the tonal distribution of the pixel data of a digital image. The histogram indicates the number of pixels at each tonal value (which may be referred to as a "brightness" or "intensity" value). Examination of such a histogram for a specific image will indicate to the viewer the entire tonal distribution of the image. Image histograms can also be used to determine whether image detail is likely to have been lost due to blown-out highlights or blacked-out shadows when an image is viewed or during processing using the image. Histogram equalization may be used in many image processing pipelines to perform contrast enhancement of the image using the image's histogram. Histogram equalization is a type of enhancement process that involves spreading out the most frequent intensity values of an image so that areas of lower local contrast gain a higher contrast. In other words, histogram equalization performs contrast enhancement by stretching the regions of the histogram that have large numbers of pixels while compressing regions of the histogram that have small numbers of pixels. Stretching the histogram implies that the dynamic range of these pixels increase, thereby enhancing the contrast. Histogram equalization is by definition content adaptive and uses the distribution function of the input image to compute the input-output pixel mapping. However, histogram equalization can cause very large changes to the image, including undesirably contouring of the image.

Figure 1A:
FIG. 1A illustrates an example of an image prior to applying a histogram equalization technique (or process).
Figure 1B:
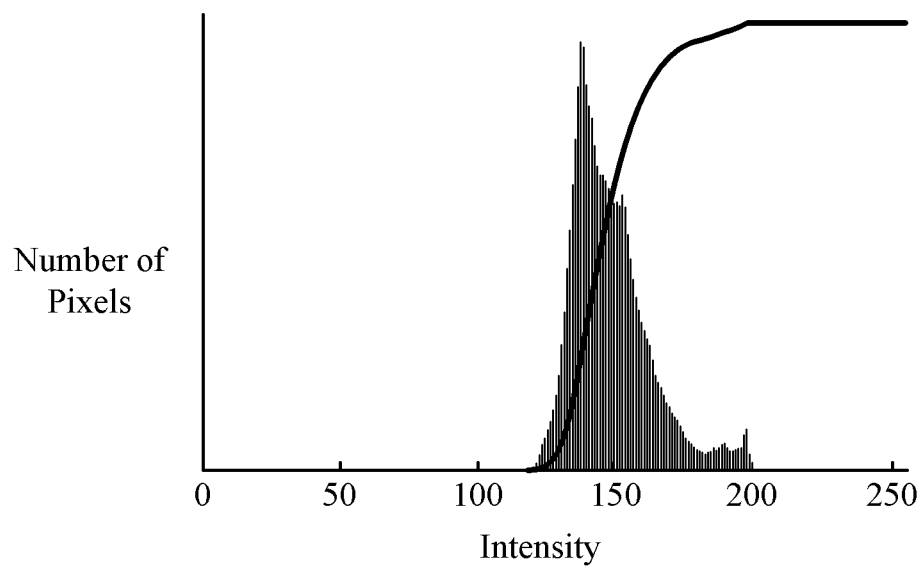
FIG. 1B is a histogram illustrating pixel intensities of the image of FIG. 1A.

FIGS. 1A and B illustrate an example of using histogram equalization. FIG. 1A is an example of an image having a plurality of pixels each having a pixel value indicating the intensity (or brightness) of the pixel. FIG. 1B illustrates an image histogram corresponding to the image depicted in FIG. 1A before a histogram equalization process (or technique) is applied to the pixel data of the image. In this example of an image histogram, the histogram illustrates tone or intensity values (sometimes referred to as "bins") along the x-axis and the number of pixels in each bin (or of each tone or intensity) along the y-axis. The image histogram shown in FIG. 1B appears compressed relative to the full range of intensities that pixel values of the image may exhibit. For example, FIG. 1B illustrates all (or nearly all) of the pixel values have an intensity (or tone) distributed in an intensity range of about 120 to 200, where the total intensity range is 0 to 255.

Figure 2A:
FIG. 2A illustrates an example of an image after applying a histogram equalization technique.
Figure 2B:
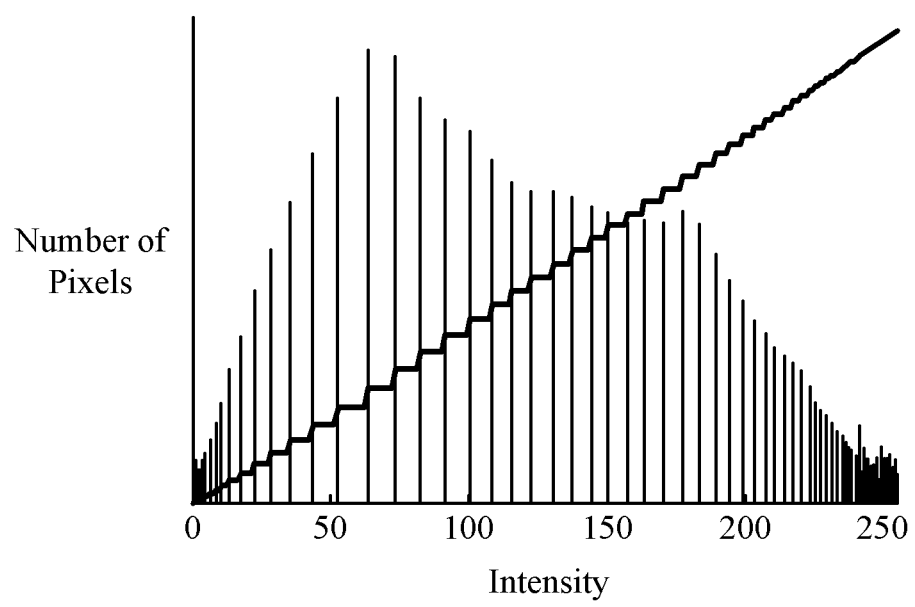
FIG. 2B is a histogram illustrating the pixel intensities of the image of FIG. 2A.

FIG. 2A illustrates the image of FIG. 1A after a histogram equalization technique has been applied to the image. FIG. 2B illustrates the resulting image histogram of the modified image that is shown in FIG. 2A. As seen in FIG. 2B, the image histogram appears to have been stretched so that the tonal intensity values are more distributed across the entire range of intensities from 0 to 255, and are less concentrated in the intensity range of 120 to 200 (along the x-axis) than before histogram equalization was applied. The resulting image, shown in FIG. 2A, correspondingly exhibits a wider range of tones than the original image (shown in FIG. 1A) but also has undesirable "contouring" due to gaps in the intensity values of the pixels of the image, as can be seen in the intensity values illustrated in FIG. 2B. That is, the intensity values are at several certain values, and the certain values are separated by more than one intensity value. The black line in each of FIGS. 1B and 2B represents the cumulative sum of the histogram values. This line has an initial value of zero and its final value is the total number of pixels in the image. In FIG. 1B, this line rises very rapidly indicating that most of the pixels in the image are concentrated in the intensity range of 120 to 200. In FIG. 2B, this line increases much more gradually which implies that the histogram is more evenly spread out as a result of the equalization procedure.

Contrast enhancement may be used to improve picture quality of many consumer electronic devices, such as televisions, media players, set top boxes, mobile phones, tablets, laptops, etc. Simple contrast enhancement can be done by increasing the dynamic range of the image through linear stretching of intensity values and applying gamma curves. However, when the pixels already span the entire intensity range these schemes may not be effective. Additionally, these schemes may also cause undesirable brightness shifts in large regions of the image or video. The methods and systems discussed below provide a global processing solution including localized contrast enhancement of images and videos that avoids the shortfalls of previous contrast enhancement approaches.

In some embodiments, localized contrast enhancement may be introduced to existing contrast limited histogram equalization processes (CLHE) which are themselves modifications of the typical histogram equalization algorithm. CLHE modifies the histogram of the input image prior to applying histogram equalization (HE). In CLHE, a threshold is applied to the histogram of the original image so that the histogram is clipped to reduce the peaks. Pixels that are lost in the clipping stage may be equally distributed to the remaining bins of the tonal distribution. Regular (that is, not contrast limited) histogram equalization is then applied on the image using the modified histogram. The histogram modification evens the original image histogram and removes large peaks that can cause contouring in the output. The resulting image enhancement is therefore not as strong as applying regular histogram equalization. Local contrast enhancement typically is done by processing large portions (or "windows") of an image individually; however, such techniques can be computationally intensive and therefore may require significant hardware resources, or result in long software processing times.

Figure 3:
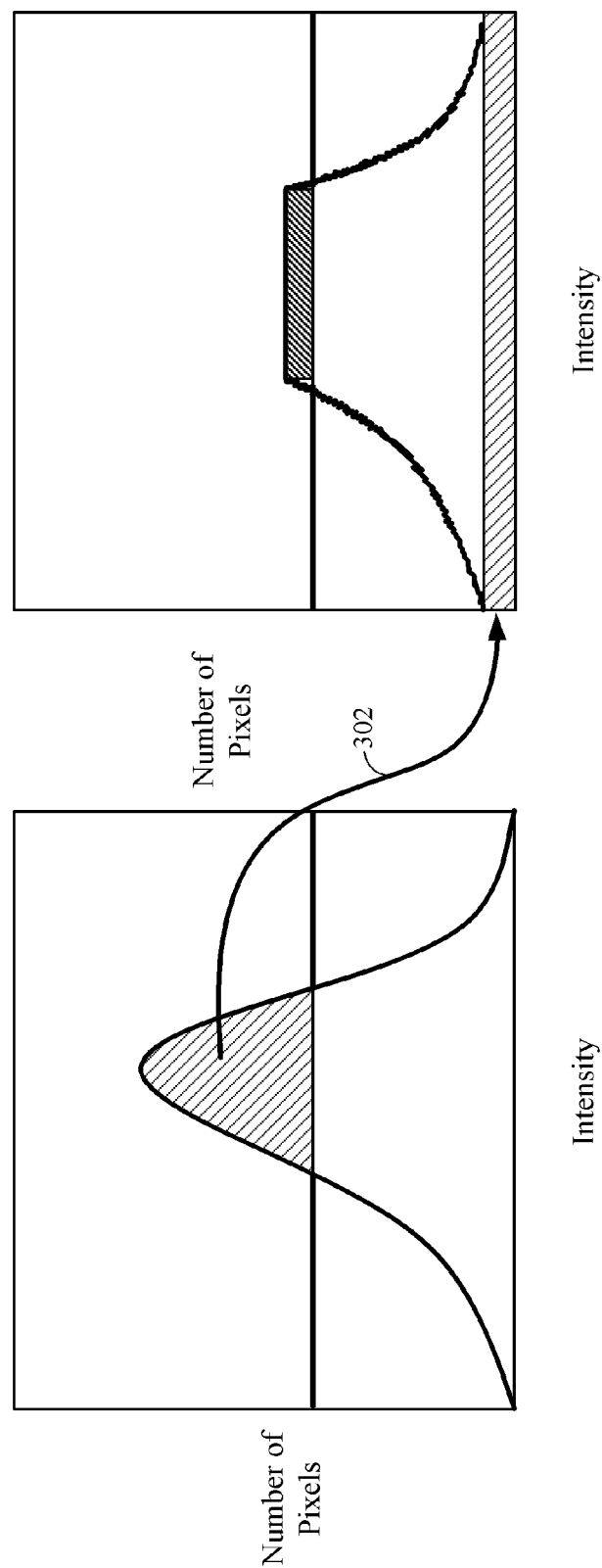
FIG. 3 is an example of clipping or thresholding applied to an image histogram as part of a contrast enhancement process.

FIG. 3 illustrates an example of an image histogram to which contrast limited histogram equalization may be applied. The histogram of the original image 304, shown on the left, is limited by a threshold value (or clamped) to reduce the peaks, as shown by the modified histogram 306 on the right. Pixels that are lost in the clamping stage are equally distributed to the remaining bins of the histogram 306; this process is represented by arrow 302. Regular histogram equalization is then applied to the modified histogram. The histogram modification serves to smooth the histogram and reduce large peaks that can cause contouring in the output. The resulting enhancement from this compound process is therefore not as strong as the resulting enhancement from a straight histogram equalization process.

The localized contrast enhancement embodiments discussed herein modify or enhance the contrast locally instead of applying global changes to the image or video data. The localized contrast enhancement is preferably content adaptive and enhances dark regions of the image or video without shifting or enhancing mid or bright regions of the image. Therefore, a better visual effect is desirably achieved by enhancing the dark regions more than the mid or bright regions. The embodiments discussed herein provide an efficient contrast enhancement algorithm that processes the image or video globally (based on histogram equalization-like algorithms) but enhance the image or video locally. These embodiments are desirably simpler to implement in either software or hardware than true localized contrast enhancement algorithms.

It is noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Embodiments may be implemented in System-on-Chip (SoC) or external hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

System Overview

Figure 4:
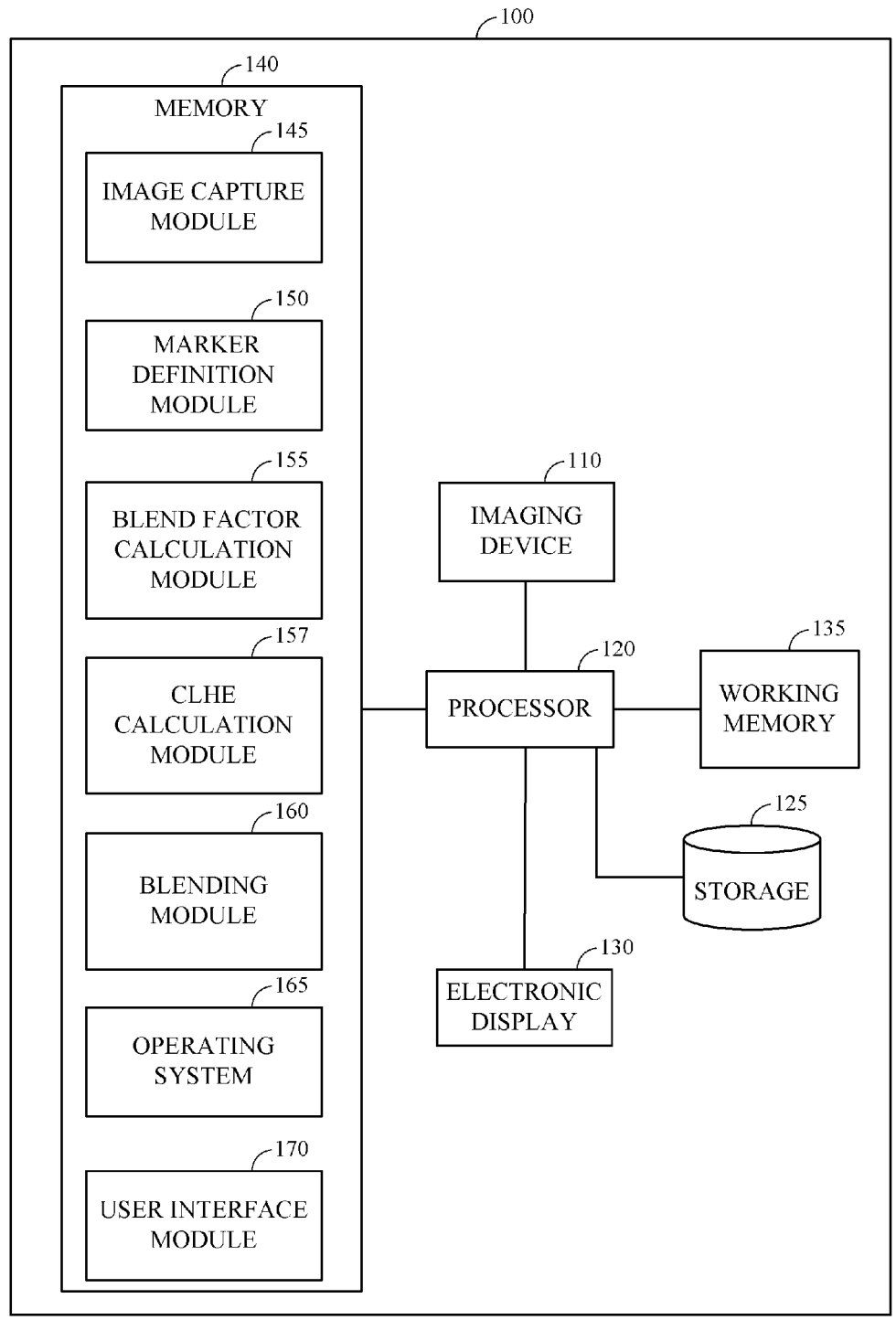
FIG. 4 is a block diagram depicting a system implementing some operative elements for localized enhancement of an image.

FIG. 4 illustrates one example of a system 100 configured to enhance the contrast of an acquired image or video. The illustrated embodiment is not meant to be limiting, but is rather illustrative of certain components in some embodiments. System 100 may include a variety of other components for other functions which are not shown for clarity of the illustrated components.

The system 100 may include an imaging device 110 and an electronic display 130. Certain embodiments of electronic display 130 may be any flat panel display technology, for example an LED, LCD, plasma, or projection screen. Electronic display 130 may be coupled to the processor 120 for receiving information for visual display to a user. Such information may include, but is not limited to, visual representations of files stored in a memory location, software applications installed on the processor 120, user interfaces, and network-accessible content objects.

Imaging device 110 may employ one or a combination of imaging sensors. The system 100 can further include a processor 120 linked to the imaging device 110. A working memory 135, electronic display 130, and program memory 140 are also in communication with processor 120. The system 100 may be a mobile device, for example a tablet, laptop computer, or cellular telephone. In other embodiments, the system 100 may be a television or desktop computer.

Processor 120 may be a general purpose processing unit or it may be a processor specially designed for imaging applications for a handheld electronic device. As shown, the processor 120 is connected to, and in data communication with, program memory 140 and a working memory 135. In some embodiments, the working memory 135 may be incorporated in the processor 120, for example, cache memory. The working memory 135 may also be a component separate from the processor 120 and coupled to the processor 120, for example, one or more RAM or DRAM components. In other words, although FIG. 4 illustrates two memory components, including memory component 140 comprising several modules and a separate memory 135 comprising a working memory, one with skill in the art would recognize several embodiments utilizing different memory architectures. For example, a design may utilize ROM or static RAM memory for the storage of processor instructions implementing the modules contained in memory 140. The processor instructions may then be loaded into RAM to facilitate execution by the processor. For example, working memory 135 may be a RAM memory, with instructions loaded into working memory 135 before execution by the processor 120.

In the illustrated embodiment, the program memory 140 stores an image capture module 145, a marker definition module 150, a blend factor calculation module 155, a contrast limited histogram equalization (CLHE) calculation module 157, a blending module 160, operating system 165, and a user interface module 170. These modules may include instructions that configure the processor 120 to perform various image processing and device management tasks. Program memory 140 can be any suitable computer-readable storage medium, for example a non-transitory storage medium. Working memory 135 may be used by processor 120 to store a working set of processor instructions contained in the modules of memory 140. Alternatively, working memory 135 may also be used by processor 120 to store dynamic data created during the operation of imaging system 100.

As mentioned above, the processor 120 may be configured by several modules stored in the memory 140. In other words, the process 120 can run instructions stored in modules in the memory 140. Image capture module 145 may include instructions that configure the processor 120 to obtain images from the imaging device. Therefore, processor 120, along with image capture module 145, imaging device 110, and working memory 135, represent one means for obtaining image sensor data.

Still referring to FIG. 4, memory 140 may also contain marker definition module 150. The marker definition module 150 may include instructions that configure the processor 120 to define a set of markers on the intensity range of the image histogram that is associated with a blend factor or value, as will be described in further detail below. The markers and blend factors may be programmed based on the type of enhancement desired. The programming of these numbers is somewhat heuristic and based on experience and visual perception of the output. In a typical marker placement, a higher number of markers are placed in regions of the histogram in which stronger enhancement is desired. These markers would also have higher blend factors associated with them. In other regions, where weaker or less enhancement is desired, fewer markers may be placed and the blend factors of these markers may be lower. The number and placement of the markers may also be adjusted according to type of display, output response of the display, strength of enhancement (such as low, medium and high settings), mode of enhancement (like sports, cinema, game), etc. Therefore, processor 120, along with marker definition module 150, and working memory 135, represents one means for defining markers on the intensity range of an image histogram.

Memory 140 may also contain blend factor calculation module 155. The blend factor calculation module 155 may include instructions that configure the processor 120 to calculate a blend factor $\beta$ for each input pixel of the image, as discussed in greater detail below. For example, the processor 120 may be instructed by the blend factor calculation module 155 to calculate the blend factor $\beta$ for each input pixel of the image and store the blend factors in the working memory 135 or storage device 125. In one embodiment, the blend factor $\beta$ for each input pixel may be calculated by determining a distance between the input pixel and two adjacent markers and using this distance to interpolate the blend factors of the two adjacent markers. Therefore, processor 120, along with marker definition module 150, blend factor calculation module 155, and working memory 135 represent one means for calculating and storing blend factors for each input pixel of the image.

Memory 140 may also contain a contrast limited histogram equalization calculation module 157. The contrast limited histogram equalization calculation module 157 illustrated in FIG. 4 may include instructions that configure the processor 120 to calculate the CLHE output value $y_{CLHE}$ for each input pixel $y_{IN}$ by applying contrast limited histogram equalization to the image histogram. Therefore, processor 120, along with contrast limited histogram equalization calculation module 157 and working memory 135, represent one means for generating a CLHE output value for each input pixel of the image.

Memory 140 may also contain a blending module 160. The blending module 160 illustrated in FIG. 4 may include instructions that configure the processor 120 to calculate an output value of each pixel of the image using the blend factors $\beta$, the input pixel values $y_{IN}$, and the CLHE output values $y_{CLHE}$. Therefore, processor 120, along with marker definition module 150, blend factor calculation module 155, contrast limited histogram equalization calculation module 157, blending module 160, and working memory 135 represent one means for calculating an output value for each pixel of an image.

Memory 140 may also contain user interface module 170. The user interface module 170 illustrated in FIG. 4 may include instructions that configure the processor 120 to provide a collection of on-display objects and soft controls that allow the user to interact with the device. The user interface module 170 also allows applications to interact with the rest of the system. An operating system module 165 may also reside in memory 140 and operate with processor 120 to manage the memory and processing resources of the system 100. For example, operating system 165 may include device drivers to manage hardware resources for example the electronic display 130 or imaging device 110. In some embodiments, instructions contained in the marker definition module 150 and blend factor calculation module 155 may not interact with these hardware resources directly, but instead interact through standard subroutines or APIs located in operating system 165. Instructions within operating system 165 may then interact directly with these hardware components.

Processor 120 may write data to storage module 125. While storage module 125 is represented graphically as a traditional disk drive, those with skill in the art would understand multiple embodiments could include either a disk-based storage device or one of several other types of storage mediums, including a memory disk, USB drive, flash drive, remotely connected storage medium, virtual disk driver, or the like.

Although FIG. 4 depicts a device comprising separate components to include a processor, imaging device, electronic display, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 4 illustrates two memory components, including memory component 140 comprising several modules and a separate memory 135 comprising a working memory, one with skill in the art would recognize several embodiments utilizing different memory architectures. For example, a design may utilize ROM or static RAM memory for the storage of processor instructions implementing the modules contained in memory 140. Alternatively, processor instructions may be read at system startup from a disk storage device that is integrated into imaging system 100 or connected via an external device port. The processor instructions may then be loaded into RAM to facilitate execution by the processor. For example, working memory 135 may be a RAM memory, with instructions loaded into working memory 135 before execution by the processor 120.

Method Overview

Embodiments of the invention relate to a process for localized contrast enhancement of an image or video that is applied globally. The examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Figure 5:
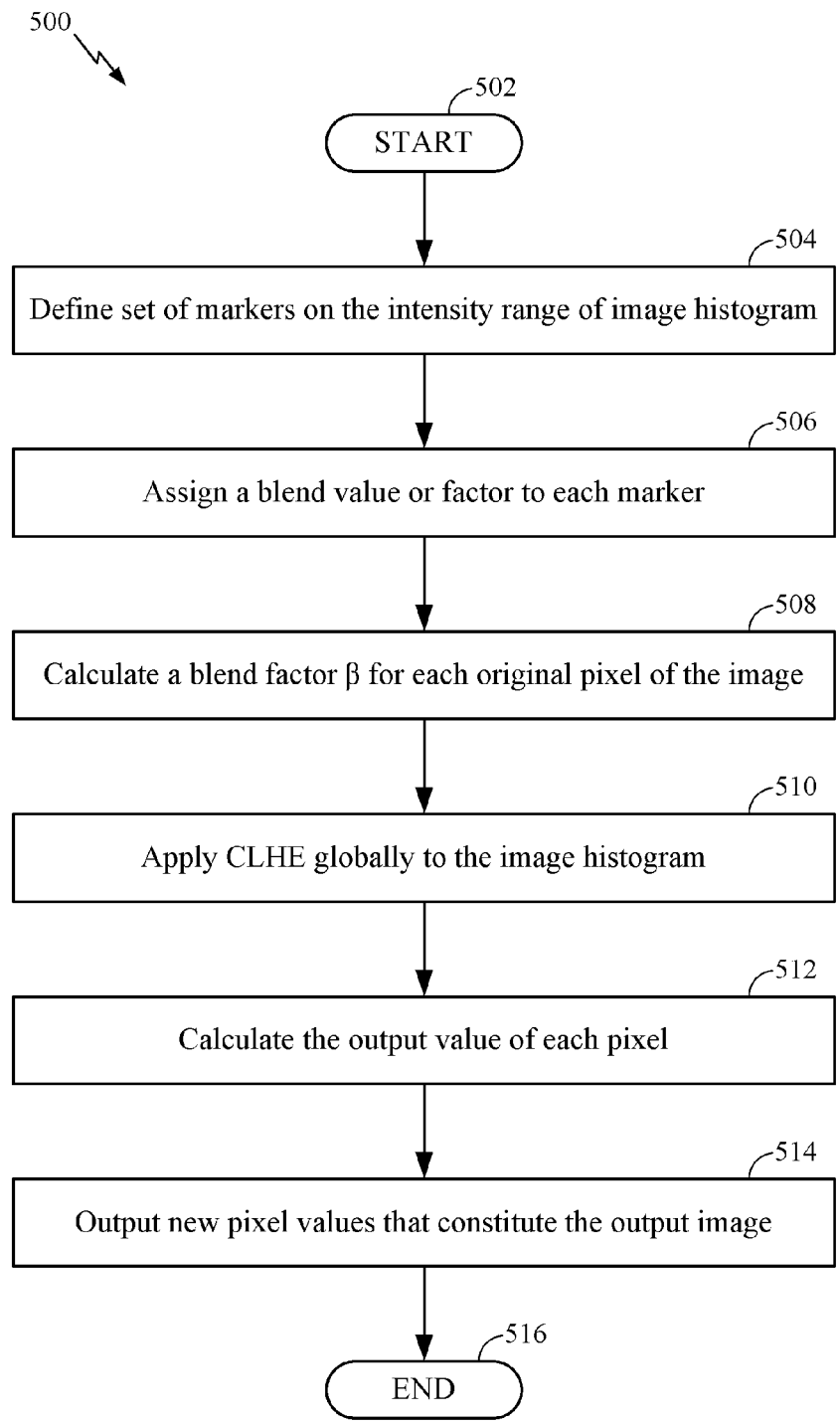
FIG. 5 is a flow chart illustrating an example of a process for localized enhancement of an image.

FIG. 5 illustrates one example of an embodiment of a process 500 to configure an electronic device to perform localized contrast enhancement on image or video data that may be implemented in one or more of the modules depicted in FIG. 4. In some examples, the process 500 may be run on a processor, for example, processor 120 (FIG. 4), and on other components illustrated in FIG. 4 that are stored in memory 140 or that are incorporated in other hardware or software.

Figure 7:
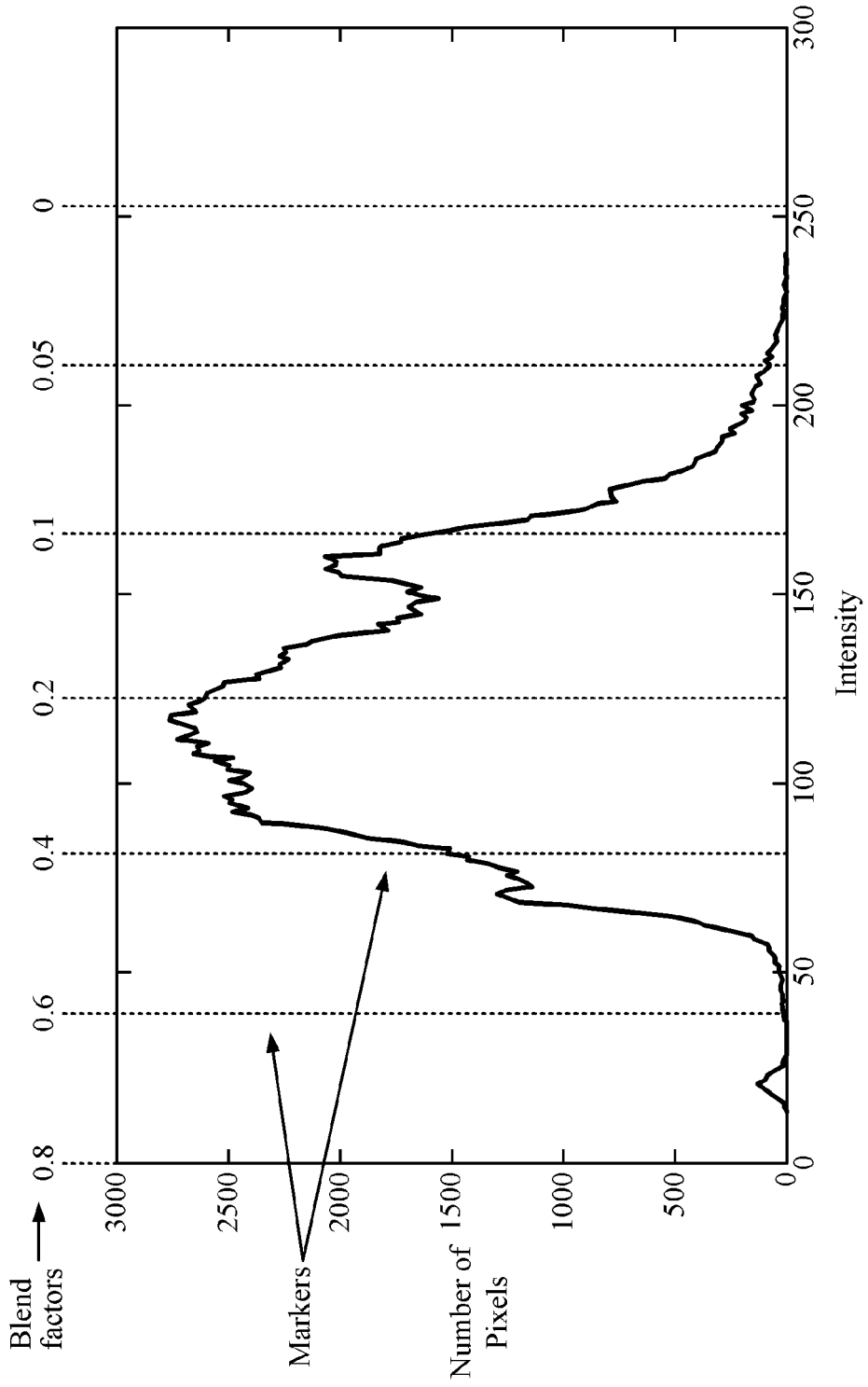
FIG. 7 is a histogram of pixel intensities of an image illustrating the placement of a plurality of markers and the associated blend factors as part of a localized contrast enhancement process.

The process 500 begins at start block 502 and transitions to block 504 wherein a processor, for example, processor 120, is instructed to define a set of markers on the intensity range of the original image histogram. In some embodiments, 6-8 markers may be defined on the intensity range. One example of 7 markers evenly distributed over the intensity range of an image histogram is shown in FIG. 7. In some embodiments, such as that shown in FIG. 7, the markers are equally spaced along the intensity range of the histogram. In other embodiments, the markers are not equally spaced along the intensity range of the histogram. The markers may be placed and distributed as discussed above with respect to FIG. 4.

The process 500 then transitions to block 506, wherein the processor is instructed to associate each marker with a blend factor or value. As illustrated in FIG. 7, the blend factors may be assigned to each marker such that darker regions of the image are weighted more heavily. This will preferably result in greater enhancement to the dark regions of the image while mid to light regions of the image are enhanced by either a small amount or not at all. Once the blend values have been assigned to each marker, as discussed above with respect to FIG. 4, process 500 transitions to block 508.

In block 508, the processor is instructed to calculate a blend factor β for each original pixel of the image. For example, for every input pixel $y_{IN}$, a blend factor β may be calculated by finding the pixel's distance from two adjacent markers that lie on either side of the pixel and using this distance to interpolate a blend factor for the pixel using the blend values of the two adjacent markers.

Process 500 next transitions to block 510, wherein the processor is instructed to apply contrast limited histogram equalization globally to the image histogram. As discussed above, in contrast limited histogram equalization (CLHE), the histogram of the original input image is modified by thresholding or clamping to reduce peaks from standing out. Pixels that are lost in the clamping stage are equally distributed to the remaining bins, as shown in FIG. 3. In one embodiment, the total number of pixels that need to be distributed is divided by the number of bins that are not affected by clamping. This average number of pixels is then added to every histogram bin that was not clamped. This redistribution procedure is performed to calculate a modified histogram and is preferably not performed on the actual image in order to reduce the possibility of introducing noise. This results in a smoother histogram that can reduce unwanted contouring of the output. Performing CLHE on the input image results in each pixel having a CLHE value, $y_{CLHE}$. Process 500 next transitions to block 512, wherein the processor is instructed to calculate the output value of each pixel. In some embodiments, the output value of each pixel $y_{OUT}$ may be calculated using the pixel's blend factor β, the pixel's input value $y_{IN}$, and the pixel's value as computed by the CLHE process, $y_{CLHE}$, as follows:

$$y_{OUT} = \beta * y_{CLHE} + (1-\beta) * y_{IN} \qquad \text{Eqn. 1}$$

After computing the output value of each pixel by blending the input value and the equalized value, as shown in Equation 1, process 500 transitions to block 514, wherein the processor is instructed to output new pixel values that constitute the output image. Process 500 then transitions to block 516 and ends.

Modifying a frame of video based on its histogram requires the frame to be stored while computing its histogram. Since frame storage is expensive for typical video/display systems, the localized enhancement process 500 shown in FIG. 5 can be easily modified to process frame N using the histogram of frame N−1, as the histogram typically does not change significantly between two consecutive frames. The localized enhancement process described herein can be applied to any intensity representation of color images such as V of HSV, Y in YCbCr, etc.

Figure 6:
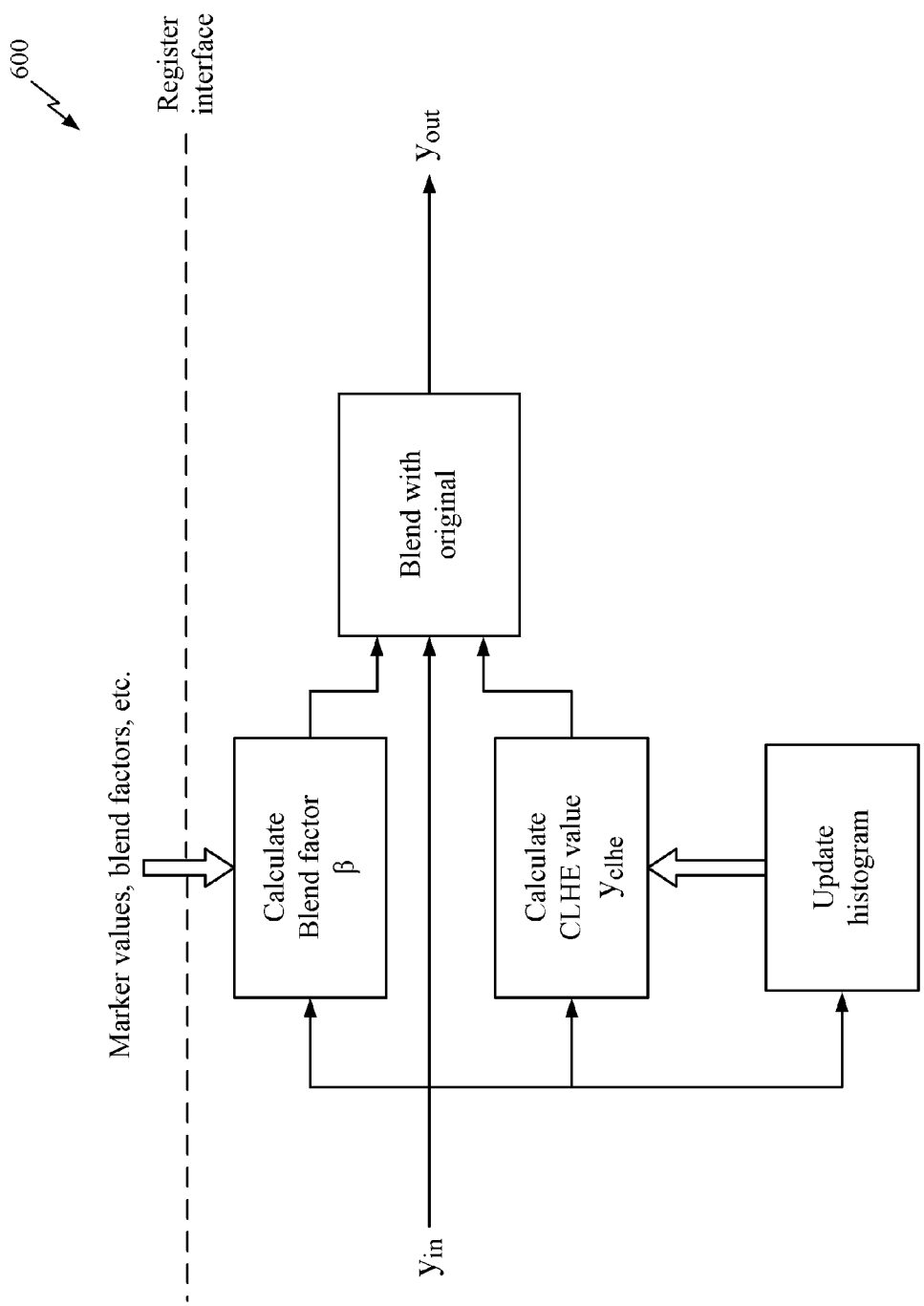
FIG. 6 is a schematic diagram illustrating a process for localized contrast enhancement of an image.

FIG. 6 graphically represents one hardware implementation 600 of the process 500 discussed above. As illustrated, marker values and blend factors for each marker are used to calculate the blend factor β for each pixel. The blend factors β and the contrast limited histogram equalized value of each pixel, $y_{CLHE}$, along with the original pixel values $y_{IN}$, are used in a blending calculation (Equation 1) to calculate a pixel output value, $y_{OUT}$. If the process 500 to modify a series of images, such as frames of video, is done in a hardware implementation such as that shown in FIG. 6, a second memory may be used to store the cumulative distribution function (CDF) of frame N−1 to modify the pixels of frame N while the first memory accumulates the histogram of frame N. These two memories can work alternatively to assemble the histogram of each image frame.

Figure 8:
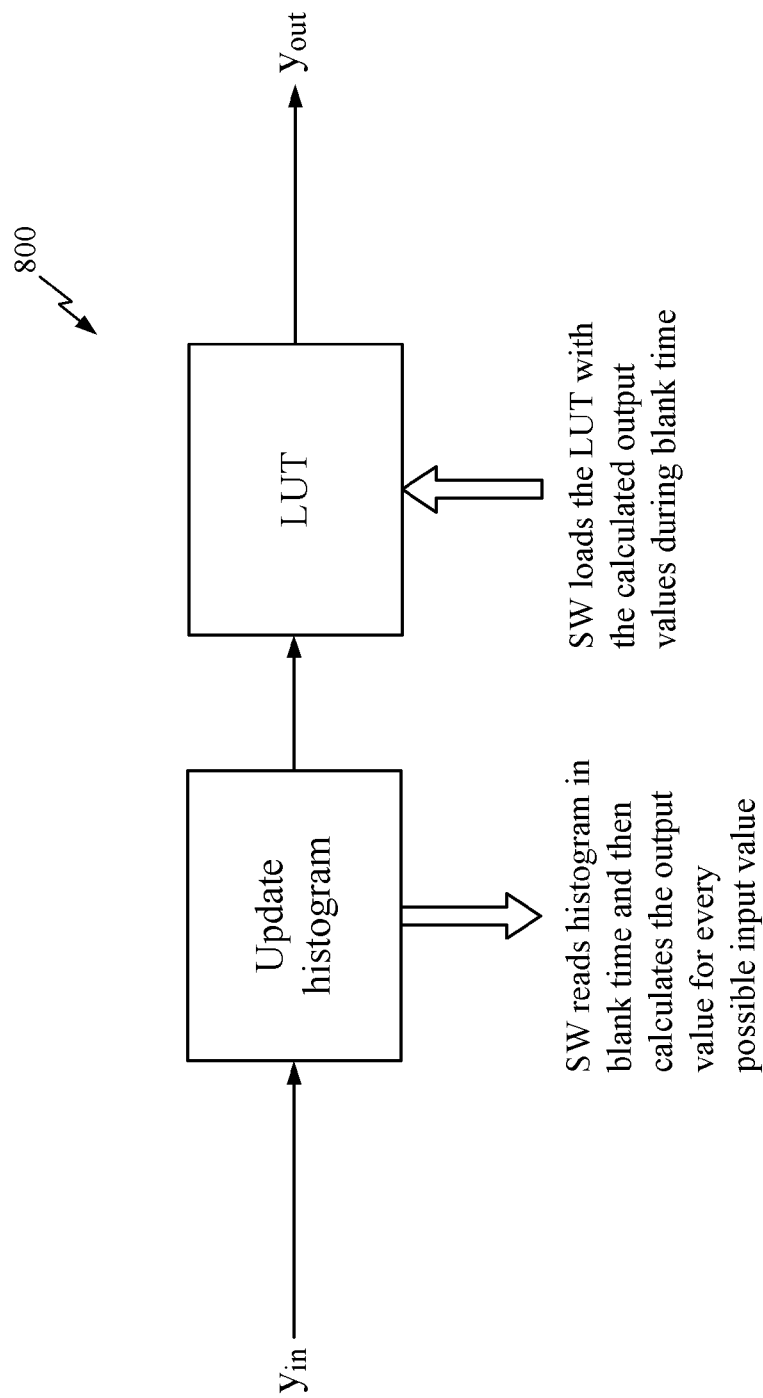
FIG. 8 is a schematic diagram illustrating an example of a software implementation of a localized contrast enhancement process.

FIG. 8 graphically represents one software implementation 800 of the process 500 discussed above. In one embodiment of a software assisted implementation of process 500, as shown in FIG. 8, the histogram of each image frame N is read by the software during the blank time between frame N and N+1. Before frame N+1 is displayed, the software programs a look up table (LUT) that maps every input pixel to an output pixel value. The LUT is configured by performing the steps outlined in FIG. 5. Instead of using an input image, the software calculates the output for every input intensity value (i.e. 0-255 for 8 bit system) and stores the result in the LUT. This output pixel value is calculated using the process 500 as described above and the computed histogram.

Figure 9A:
FIG. 9A is an example of an image prior to applying a localized contrast enhancement process.
Figure 9B:
FIG. 9B is the image of FIG. 9B after applying a localized contrast enhancement process.

One result of application of the localized contrast enhancement process described above with respect to FIG. 5 as applied to an image is illustrated in FIGS. 9A and 9B. FIG. 9A illustrates the original input image. FIG. 9B illustrates the resulting image after applying localized enhancement, such as process 500. In the enhanced image, the blacks are darker and the whites are whiter. This example shows that reasonably bright images are treated similar to traditional images processed with luma stretch algorithms while a darker scene is treated differently. For the darker scene, dark pixels are made brighter to bring out details while brighter pixels are largely unaffected.

Sunlight Visibility Improvement

Pixel processing such as that used in the localized enhancement process discussed above may also be used to improve the visibility of content on mobile screens when in sunlight. Pixel processing may be used, along with increasing the display backlight, to increase the dynamic range of the picture adapted to content and increase the contrast in dark regions of the picture.

A process similar to the localized enhancement process 500 discussed above may be used to improve the visibility of mobile device screens in sunlight by applying a higher clip limit to the histogram and varying the blend factors of the dark regions of the image. The parameters of the localized contrast enhancement method can be based on the ambient light conditions so that the processing can smoothly change from contrast enhancement (in low ambient light) to sunlight visibility processing (in high ambient light). In some embodiments, ambient light conditions can be used to determine the distribution of markers along the intensity range of the histogram and the assignment of blend factors to the markers. If an ambient light value is higher than a threshold, then the device is probably being used outside in a bright environment. The visibility of the screen is usually much lower in bright environments. Therefore, the markers and blend factors can be reprogrammed to adjust for the bright environment. In some embodiments, multiple sets of predetermined values are stored in memory and one of the predetermined sets is chosen based on the ambient light condition.

When the device is operating in sunlight visibility improvement mode, contouring may be visible on certain pictures due to the stronger enhancement applied to enable the screen to be more easily viewed in the ambient light condition. Contouring is caused when similar brightness levels are stretched apart due to contrast enhancement. Contouring is typically visible on large and slowly varying regions of an image, such as the sky or the ocean. Factors that contribute to contouring include smaller numbers of brightness levels due to quantization, inaccurate upstream processing, and compression noise.

However, contouring may be reduced when operating in sunlight visibility improvement mode by adding a random noise to the output pixel $y_{OUT}$, as shown below in Equation 2.

$$y_{out}=\beta*y_{CLHE}+(1-\beta)*y_{IN}+\epsilon_{IN} \qquad \text{Eqn. 2}$$

Where $y_{CLHE}$, $y_{IN}$, and $\beta$ are defined as discussed above with respect to Equation 1.

In some embodiments, the random noise additive factor $\epsilon_{IN}$ may be generated by a Gaussian noise generator that uses noise sigma $\sigma(I)$ Sigma is typically not the same for all pixels, otherwise the entire image would appear noisy. Sigma is instead a function of pixel intensity. In some embodiments, sigma is directly proportional to high histogram values (after performing the contrast limiting histogram equalization step) since these pixels are more prone to contouring.

In one example, sigma may be calculated as follows:

$$\sigma(I)=\min(\sigma_{base},\sigma_{IN}*hist(I)/\text{ClipLevel}) \qquad \text{Eqn. 3}$$

where
hist(I)=histogram value at intensity I (after clipping),
ClipLevel=maximum histogram value,
$\sigma_{in}$=input sigma value, and
$\sigma_{base}$=base sigma value for pixels that have low histogram values (to give a small noise floor level to all pixels).

Figure 10:
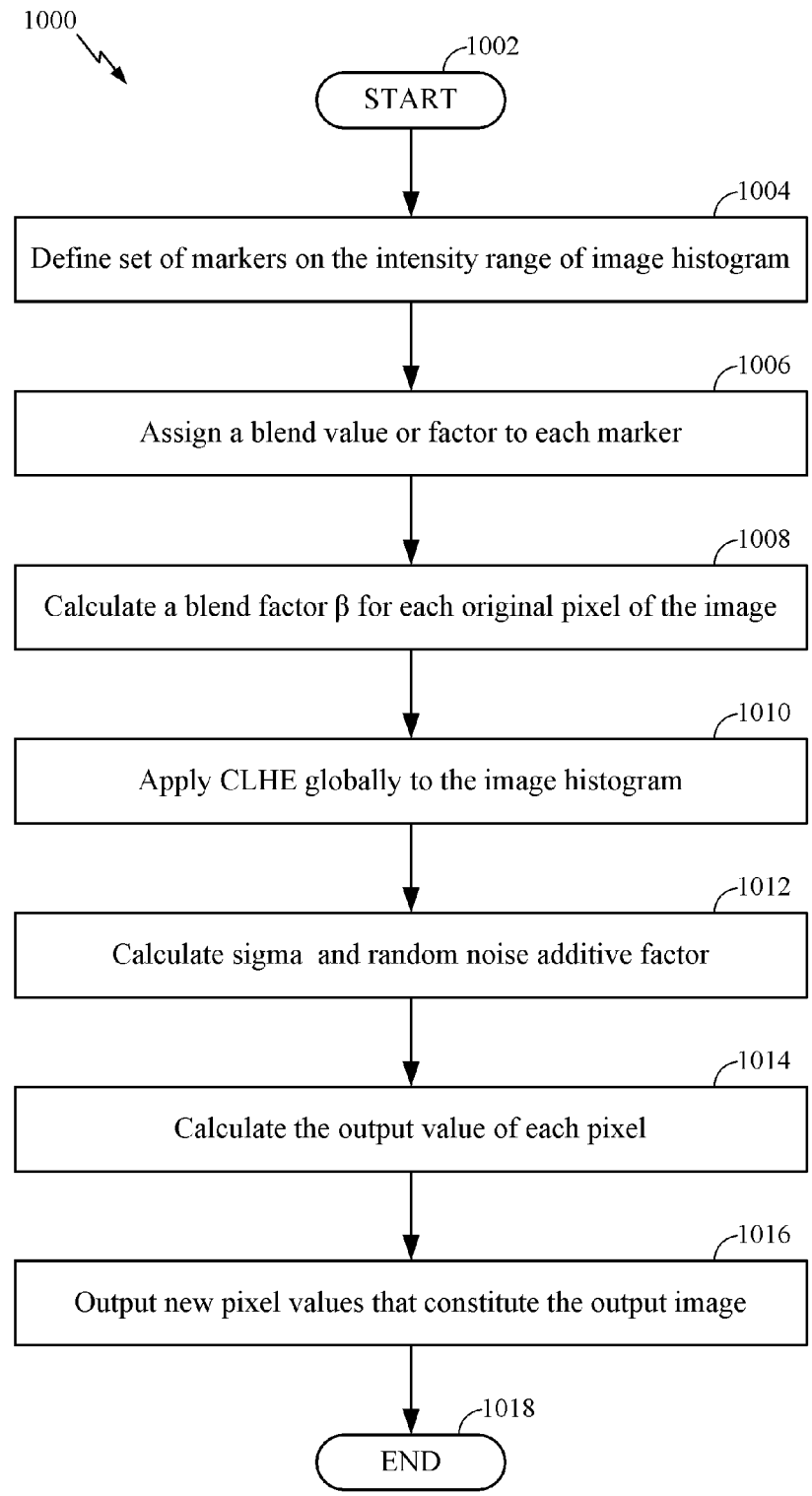
FIG. 10 is a flow chart illustrating a process for improving the visibility of a display of an electronic device when the display is illuminated directly or indirectly with sunlight, that is, a process for sunlight visibility improvement for an electronic device.

FIG. 10 illustrates one embodiment of a process 1000 to configure an electronic device to perform sunlight visibility enhancement of a screen of an electronic device that may be implemented in one or more of the modules depicted in FIG. 4. In some examples, the process 1000 may be run on a processor, for example, processor 120 (FIG. 4), and on other components illustrated in FIG. 4 that are stored in memory 140 or that are incorporated in other hardware or software.

The process 1000 begins at start block 1002 and transitions to block 1004 wherein a processor, for example, processor 120, may be instructed to define a set of markers on the intensity range of the original image histogram. In some embodiments, 6-8 markers may be defined on the intensity range. As discussed above, the markers may be equally spaced along the intensity range of the histogram but in other embodiments, the markers may not be equally spaced along the intensity range of the histogram.

The process 1000 then transitions to block 1006, where the processor may be instructed to associate each marker with a blend factor or value. As illustrated in FIG. 7, the blend factors may be assigned to each marker such that darker regions of the image are weighted more heavily. This will preferably result in greater enhancement to the dark regions of the image while mid to light regions of the image are enhanced by either a small amount or not at all. Once the blend values have been assigned to each marker, process 1000 transitions to block 1008.

In block 1008, the processor may be instructed to calculate a blend factor $\beta$ for each original pixel of the image. For example, for every input pixel $y_{IN}$, a blend factor $\beta$ may be calculated by finding the pixel's distance from two adjacent markers that lie on either side of the pixel and using this distance to interpolate a blend factor for the pixel using the blend values of the two adjacent markers.

Process 1000 next transitions to block 1010, wherein the processor may be instructed to apply contrast limited histogram equalization globally to the image histogram. As discussed above, in contrast limited histogram equalization (CLHE), the histogram of the original input image is modified by thresholding or clamping to reduce peaks from standing out. Pixels that are lost in the clamping stage are equally distributed to the remaining bins, as shown in FIG. 3. This results in a smoother histogram that can reduce unwanted contouring of the output. Performing CLHE on the input image results in each pixel having a CLHE value, $y_{CLHE}$. Process 1000 next transitions to block 1012, wherein the processor is instructed to calculate sigma $\sigma(I)$ and the random noise additive factor $\epsilon_{IN}$. As discussed above, sigma is directly proportional to high histogram values (after performing the contrast limiting histogram equalization step) and may be calculated according to Equation 3. Once sigma has been calculated, the random noise additive factor $\epsilon_{IN}$ may be generated by a Gaussian noise generator.

After determining the random noise additive factor, process 1000 transitions to block 1014 wherein the processor is instructed calculate the output value of each pixel. In some embodiments, the output value of each pixel may be calculated using the pixel's blend factor $\beta$, the pixel's input value $y_{IN}$, and the pixel's value as computed by the CLHE process, $y_{CLHE}$, as in Equation 2, repeated here:

$$y_{out}=\beta * y_{CLHE} + (1-\beta) * y_{IN} + \epsilon_{IN} \quad \text{Eqn. 2}$$

After computing the output value of each pixel by blending the input value and the equalized value, as shown in Equation 1, process 1000 transitions to block 1016, wherein the processor is instructed to output new pixel values that constitute the output image. Process 1000 then transitions to block 1018 and ends.

Figure 11:
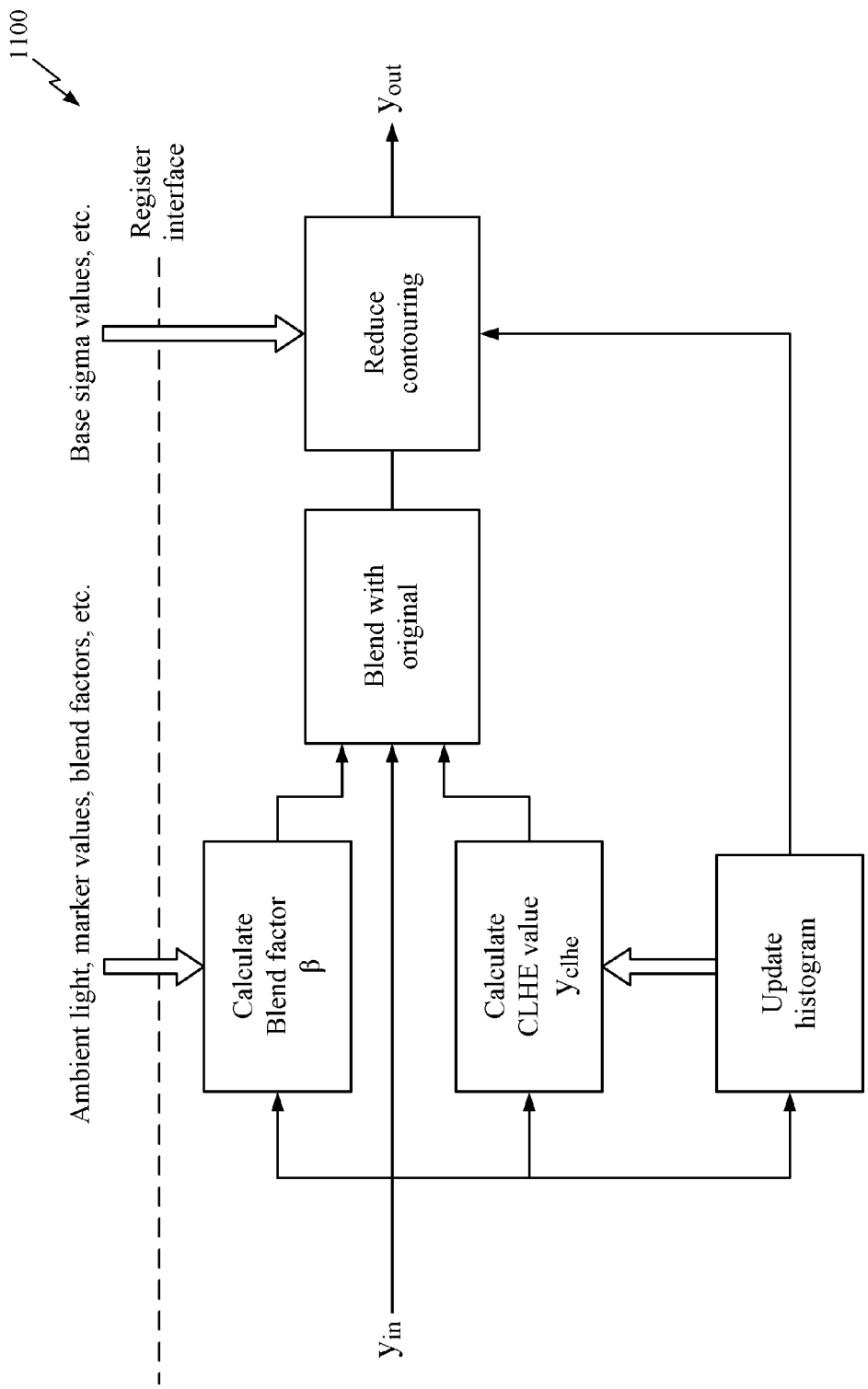
FIG. 11 is a schematic diagram illustrating an example of a process for sunlight visibility improvement for an electronic device.

FIG. 11 illustrates a schematic 1100 representing one example embodiment of the process 1000 discussed above, as it may be implemented in hardware, or in software components, or both. As illustrated, ambient light conditions, marker values and blend factors for each marker are used to calculate the blend factor $\beta$ for each pixel. The blend factors $\beta$ and the contrast limited histogram equalized value of each pixel, $y_{CLHE}$, along with the original pixel values $y_{IN}$, and the random noise additive factor $\epsilon_{IN}$ are used in a blending calculation (Equation 2) to calculate a pixel output value, $Y_{OUT}$. Desirably, sunlight visibility enhancement of a screen with noise addition will hide any undesirably contouring in the sky or open regions of an image while not affecting the more detailed or mid to light regions of the image, such as buildings.

Clarifications Regarding Terminology

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A system for improving the contrast of image frames, comprising:
a control module configured to
determine a histogram representation of an image having a plurality of pixels, each pixel having an intensity value within a range of intensity values, the histogram including the number of pixels of the image that have an intensity value for each intensity value in the range of intensity values;
define a set of markers spaced across at least a portion of the range of intensity values of the histogram of the image, each marker having an associated blend factor;
determine a pixel blend factor for each pixel of the image based on at least one marker blend factor;
determine a first equalized pixel output value for each pixel; and
calculate a final equalized pixel output value for each pixel of the image, the final equalized pixel output value for each pixel based on the pixel blend factor of that pixel, the first equalized pixel output value of that pixel, and an original pixel value of that pixel.

2. The system of claim 1 further comprising an imaging device comprising an imaging sensor.

3. The system of claim 1, wherein the control module is a component of a camera application for a mobile device.

4. The system of claim 1, wherein the markers are equally spaced across the range of intensity values.

5. The system of claim 1, wherein for a particular pixel, the pixel blend factor is based on interpolating the blend factors of two adjacent markers.

6. The system of claim 1, wherein the control module is further configured to perform contrast limited histogram equalization for each pixel of the image to obtain a first equalized pixel output value for each pixel.

7. The system of claim 1, wherein the control module is further configured to add a random noise value to the final equalized pixel output value for each pixel.

8. The system of claim 1, wherein the control module is further configured to output a modified image based on the final equalized pixel output values.

9. The system of claim 1, wherein blend factors defined in low intensity value regions of range of intensity values have a higher weight than the blend factors defined in high intensity value regions of the histogram.

10. The system of claim 1, wherein the blend factor for each marker is at least partially based on an ambient light level.

11. A method for improving the contrast of image frames, comprising:
determining a histogram representation of an image having a plurality of pixels, each pixel having an intensity value within a range of intensity values, the histogram including the number of pixels of the image that have an intensity value for each intensity value in the range of intensity values;
defining a set of markers spaced across at least a portion of the range of intensity values of the histogram of the image, each marker having an associated blend factor;
determining an pixel blend factor for each pixel of the image based on at least one marker blend factor;
determining a first equalized pixel output value for each pixel; and
calculating a final equalized pixel output value for each pixel of the image, the final equalized pixel output value for each pixel based on the pixel blend factor of that pixel, the first equalized pixel output value of that pixel, and an original pixel value of that pixel.

12. The method of claim 11, wherein the markers are equally spaced along the range of intensity values.

13. The method of claim 11, wherein for a particular pixel, the pixel blend factor is based on interpolating the blend factors of two adjacent markers.

14. The method of claim 11 further comprising performing contrast limited histogram equalization for each pixel of the image to obtain a first equalized pixel output value for each pixel.

15. The method of claim 11 further comprising adding a random noise factor to add a random noise value to the final equalized pixel output value for each pixel.

16. The method of claim 11 further comprising outputting a modified image based on the final equalized pixel output values.

17. The method of claim 11, wherein defining a set of markers spaced across at least a portion of the range of intensity values of the histogram representation of the image is at least partially determined by an ambient light level.

18. The method of claim 11, wherein determining a blend factor for each marker is at least partially determined by an ambient light level.

19. An apparatus for improving the contrast of image frames, comprising:
means for determining a histogram representation of an image having a plurality of pixels, each pixel having an intensity value within a range of intensity values, the histogram including the number of pixels of the image that have an intensity value for each intensity value in the range of intensity values;
means for defining a set of markers spaced across at least a portion of the range of intensity values of the histogram of the image, each marker having an associated blend factor;
means for determining a pixel blend factor for each pixel of the image based on at least one marker blend factor;
means for determining a first equalized pixel output value for each pixel; and
means for calculating a final equalized pixel output value for each pixel of the image, the final equalized pixel output value for each pixel based on the pixel blend factor of that pixel, the first equalized pixel output value of that pixel, and an original pixel value of that pixel.

20. A non-transitory computer-readable medium storing instructions that, when executed, cause at least one physical computer processor to perform a method for improving the contrast of image frames, the method comprising:
determining a histogram representation of an image having a plurality of pixels, each pixel having an intensity value within a range of intensity values, the histogram including the number of pixels of the image that have an intensity value for each intensity value in the range of intensity values;
defining a set of markers spaced across at least a portion of the range of intensity values of the histogram representation of the image, each marker having an associated blend factor;
determining a pixel blend factor for each pixel of the image based on at least one marker blend factor;
determining a first equalized pixel output value for each pixel; and calculating a final equalized pixel output value for each pixel of the image, the final equalized pixel output value for each pixel based on the pixel blend factor of that pixel, the first equalized pixel output value of that pixel, and an original pixel value of that pixel.

21. The non-transitory computer-readable medium of claim 20, wherein the markers are equally spaced across the range of intensity values.

22. The non-transitory computer-readable medium of claim 20, wherein for a particular pixel, the pixel blend factor is based on interpolating the blend factors of two adjacent markers.

23. The non-transitory computer-readable medium of claim 20 further comprising performing contrast limited histogram equalization for each pixel of the image to obtain a first equalized pixel output value for each pixel.

24. The non-transitory computer-readable medium of claim 20 further comprising adding a random noise value to the final equalized pixel output value for each pixel.

25. The non-transitory computer-readable medium of claim 20 further comprising outputting a modified image based on the final equalized pixel output values.

26. The non-transitory computer-readable medium of claim 20, wherein defining a set of markers spaced across at least a portion of the range of intensity values of the histogram representation of the image is at least partially determined by an ambient light level.

27. The non-transitory computer-readable medium of claim 20, wherein determining a blend factor for each marker is at least partially determined by an ambient light level.

* * * * *